United States Patent [19]

Shoki

[11] Patent Number: 5,894,598
[45] Date of Patent: Apr. 13, 1999

[54] RADIO COMMUNICATION SYSTEM USING PORTABLE MOBILE TERMINAL

[75] Inventor: Hiroki Shoki, Kawasaki, Japan

[73] Assignee: Kabushiki Kaisha Toshiba, Kawasaki, Japan

[21] Appl. No.: 08/711,474

[22] Filed: Sep. 6, 1996

[30] Foreign Application Priority Data

Sep. 6, 1995 [JP] Japan .................................. 7-228911

[51] Int. Cl.$^6$ ...................................................... H04B 7/26
[52] U.S. Cl. ........................... 455/562; 455/65; 455/277.2
[58] Field of Search ..................................... 455/506, 517, 455/524, 62, 63, 65, 67.1, 67.3, 561, 562, 277.1, 277.2, 278.1

[56] References Cited

U.S. PATENT DOCUMENTS

| 5,095,535 | 3/1992 | Freeburg | 455/65 |
| 5,561,850 | 10/1996 | Makitalo et al. | 455/506 |
| 5,576,717 | 11/1996 | Searle et al. | 455/562 |

*Primary Examiner*—Thanh Cong Le
*Attorney, Agent, or Firm*—Foley & Lardner

[57] ABSTRACT

A radio communication system comprises a transmitting antenna for transmitting radio signals. Each radio signal is transmitted via one of a plurality of beams of different maximum radiated directions. The system also comprises a transmitting section for adding to a radio signal, transmitted via an i-th beam among the plurality of beams, beam identification information that identifies on which i-th beam of said plurality of beams said radio signal is being transmitted. The system further comprises a receiving antenna for receiving the radio signals transmitted by the plurality of beams and a receiver for selectively receiving a signal transmitted by a specific beam according to a predetermined estimation standard. Alternatively, the system may comprise a first radio station and a second radio station. The first radio station may include a transmitting antenna for transmitting signals with beam identification numbers and a receiving antenna for receiving signals from other radio stations. The second radio station may include a receiving antenna capable of receiving signals transmitted by the first transmitting antenna and a receiver for selectively receiving a signal transmitted by a specific beam according to a predetermined estimation standard. The second radio station may also include a transmitting antenna that forms a wide-angle beam to transmit the specific beam.

8 Claims, 9 Drawing Sheets

RADIO COMMUNICATION SYSTEM USING PORTABLE MOBILE TERMINAL

BACKGROUND OF THE INVENTION

The present invention relates to a radio communication system using a portable mobile terminal. More specifically, the invention relates to a radio communication system for realizing a high transmission rate and a large quantity of information.

In recent years, with the development of mobile communication and the enhancement of the quantity of communication, it is expected that there will be a great demand for high-speed, large-capacity mobile radio communication systems using potable mobile terminals in the near future.

Figure 1:
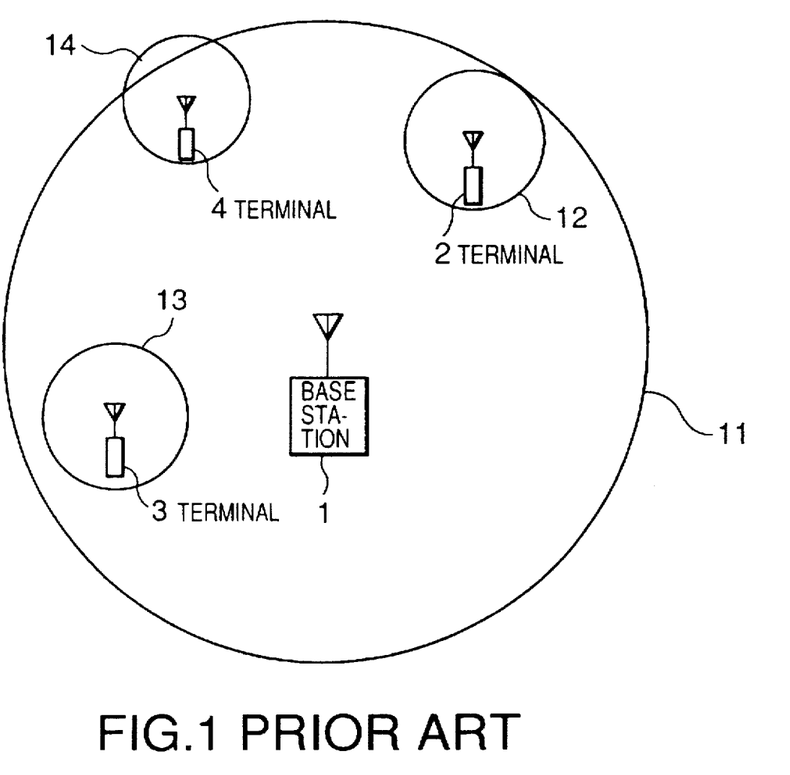
FIG. 1 is a conceptual view illustrating an example of a conventional radio communication system.

FIG. 1 illustrates a conventional mobile radio communication system. In this figure, a base station 1 forms an omni-directional beam 11, which can covers a given area, by means of a transmitting antenna, so as to allow communication to be established wherever a mobile terminal lies in the coverage area.

In addition, mobile terminals 2, 3 and 4 also form omni-divisional beams 12, 13 and 14 by means of antennas, so as to allow communication to be established regardless of the direction of the base station from each of the terminals.

With this construction, it is possible to realize a mobile communication system, which enable communication in any places. However, considering that information to be communicated will be large-capacity, high-capacity in the near future, it is desired to realize a radio communication link suitable for the high-speed, large-capacity information.

In order to obtain a high-gain transmitting-receiving antenna suitable for such a communication system, it is required to sharpen an antenna beam pattern. In this case, the base station and the terminals must have the constructions for forming shaper beams as shown in FIG. 2.

Figure 2:
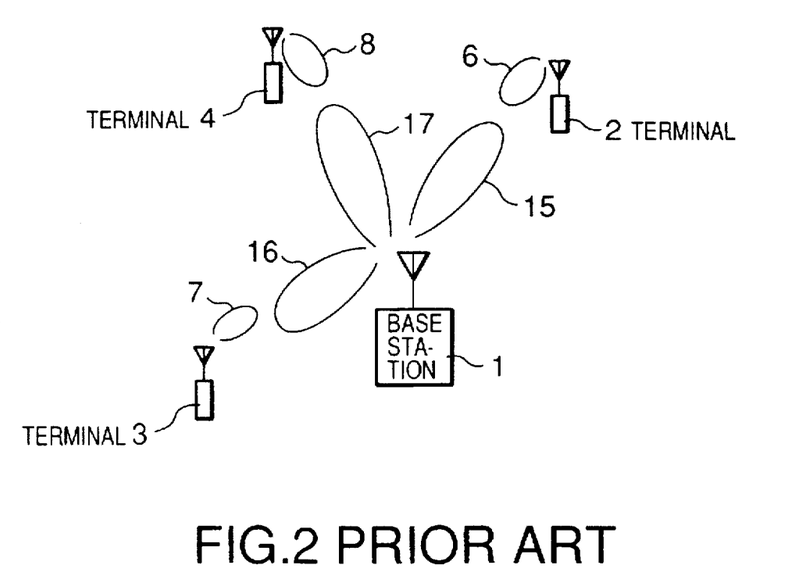
FIG. 2 is a conceptual view illustrating anther example of a conventional radio communication system.

In FIG. 2, the base station 1 forms narrow beams 15, 16 and 17 which are capable of transmitting and receiving signals toward the terminals 2, 3 and 4. On the other hand, the terminals 2, 3 and 4 forms narrow beams 6, 7 and 8 which are capable of transmitting and receiving signals toward the base station 1.

For example, in a case where different frequency bands are allotted to the respective beams 15, 16 and 17 formed by the base station 1, the beams 15, 16 and 17 may be formed at the same time.

Alternatively, in a case where communication is established in a time-division system, the beams 15, 16 and 17 formed by the base station 1 may be switched every a predetermined period of time. In this way, it has been able to be technically practiced that the direction of a narrow beam is scanned by using a conventional phased array antenna.

Figure 3:
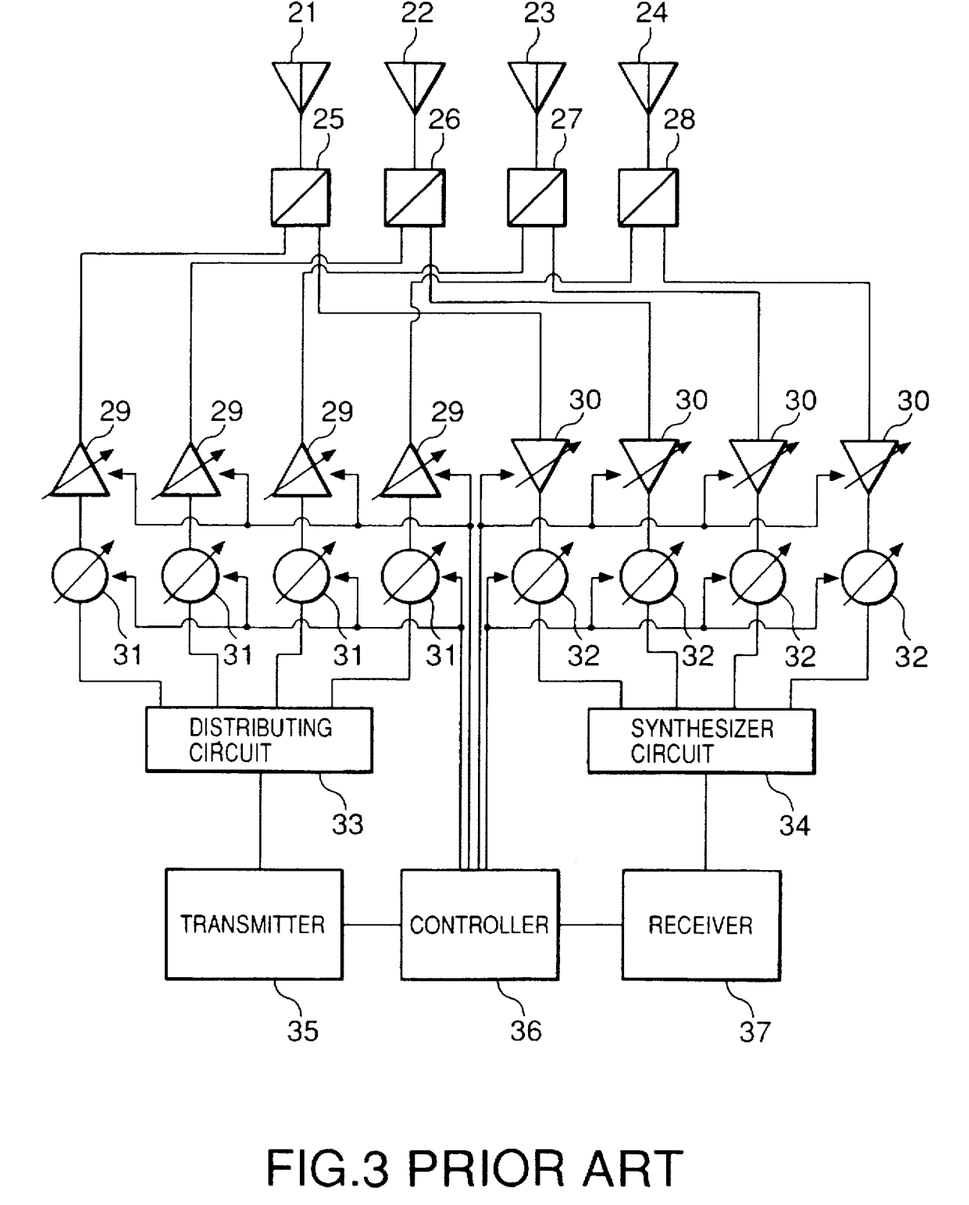
FIG. 3 is a diagram illustrating an example of a phased array antenna for use in a conventional radio communication system.

FIG. 3 illustrates an example of a high-gain beam scanning antenna in a conventional radio communication system. In this figure, antenna elements 21, 22, 23 and 24 are connected to diplwxers or transmission-reception (TR) switches 25, 26, 27 and 28, respectively, so that the transmitting and receiving of a radio signal are separated.

The signals received by the respective antenna elements are supplied to corresponding phase shifters 32 via amplitude-variable amplifiers 30, and the amplitude and phase of the signals are weighted so that radio waves in a predetermined direction are received. The signals outputted from the respective phase shifters 32 are supplied to a receiver 37 via a synthesizer circuit 34.

With respect to transmission, the signals supplied from a transmitter 35 are distributed by means of a distributing circuit 33, and then the amplitude and phase of the signals are weighted by means of amplitude-variable amplifiers 29. Then, the signals are transmitted to the respective antenna elements via the TR switches 25, 26, 27 and 28, so that the synthesized directivity of the respective antenna elements forms a beam in a predetermined direction.

The phase shifters 31 and 32 and the amplifiers 29 and 31 are controlled by a controller 36, so that radio waves in a predetermined direction are transmitted and received by comparing received signal levels and so forth.

It is possible to perform the gain enhancement and the beam scanning according to the method as set forth above. However, considering that it is applied to an actual system, the construction, control and so forth of a radio transmitter-receiver are extremely complicated as described below.

Since the base station 1 communicates with terminals serving as the other parties in communication, it is required to discriminate the directions of the respective terminals to turn beams to the optimum directions for the respective terminals.

In addition, it must be assumed that the respective terminals move in mobile communication, so that it is required to cause the base station to independently follow the directions of all the terminals.

For the reasons as set forth above, in a case where a phase array antenna is used, independent feed circuits are required for each of beams, so that the construction of the base station is complicated. For example, in a case where communications between the base station and a plurality of terminals are established, a plurality of feed circuits for setting the individual amplitude and phase weight are required.

In addition, in a case where the direction of the beam (terminal) is switched by time base, a phase shifter and an amplifier must be switched at a high speed. In either cases, since a control system must be independently operated, the software therefor is complicated, and a great deal of labor is required in a processing system.

As mentioned above, although it is required to enhance the gains of antennas of a base station and terminals in accordance with the increase of the speed and capacity of communication which will be required in future, there is a problem in that the construction and control of an antenna feed circuit are extremely complicated.

SUMMARY OF THE INVENTION

It is therefore an object of the present invention to eliminate the aforementioned problems and to provide a radio system in which a base station has a simple construction and which can be easily controlled.

In order to accomplish the aforementioned and other objects, according to a first aspect of the present invention, a radio communication system comprises: a transmitting antenna for forming a plurality of beams of different maximum radiated directions, and for adding, to a signal transmitted by a beam of number i among the plurality of beams, a beam identification information being capable of discriminating that the signal is transmitted by the beam of number i, for transmitting the signal as a radio signal; a receiving antenna for receiving the radio signal transmitted from the transmitting antenna by the beam; and a receiver for selectively receiving a signal, which is transmitted from the transmitting antenna by a specific beam, on the basis of a predetermined estimation standard.

The predetermined estimation standard may be a standard in which a signal of a beam of the maximum received-signal intensity transmitted from the transmitting antenna is selected.

Alternatively, the predetermined estimation standard may be a standard in which a signal of a beam of the maximum signal-to-noise ratio (S-N ratio) transmitted from the transmitting antenna is selected.

According to a second aspect of the present invention, a radio communication system comprises: a first radio station including a transmitting antenna for forming a plurality of beams of different maximum radiated directions and for adding, to a signal transmitted by a beam of number i among the plurality of beams, a beam identification information being capable of discriminating that the signal is transmitted by the beam of number i, and a receiving antenna for receiving radio signals, which are transmitted from other radio stations, by a wide-angle or omni-directional beam; and a second radio station including a receiving antenna which is capable of receiving the signal transmitted by the beam from the receiving antenna of the first radio station, a receiver for selectively receiving, on the basis of an estimation standard, a signal of a beam of number j among specific beams formed by the transmitting antenna of the first radio station, and a is transmitting antenna for forming a wide-angle or omni-directional beam to transmit the beam of number j selectively received among the beams transmitted from the transmitting antenna of the first radio station.

The first radio station may receive a signal, to which information on the number j of the beam selectively received by the second radio station is added, and the signal to be transmitted to the second radio station may be transmitted using the beam of number j among the plurality of beams of different maximum radiated directions A frequency band of radio waves transmitted by the first radio station may be higher than a frequency band of received radio waves.

By the above construction and function, the present invention has the following effects.

According to the first aspect of the present invention, it is possible to transmit high-gain radio waves in different directions by forming a plurality of beams of different maximum radiated directions in a transmitting antenna. In this case, beam identification information being capable of discriminating that a signal is transmitted by a beam of number i among the plurality of beams, is added to the signal transmitted by the beam of number i so that the transmitted respective beams can be discriminated (by receivers). The receiving antenna receives a signal by a beam from the transmitting antenna, and the receiver selectively receives a signal by a specific beam of the transmitting antenna, so that it is possible to receive a signal of the most preferred beam for the estimation standard.

In addition, it is possible to select a signal of a beam of the maximum received-signal intensity from the transmitting antenna by selecting a received-signal intensity as the estimation standard.

Moreover, it is possible to select a signal of a beam of the transmitting antenna, the beam having the maximum signal-to-noise ratio (S-N ratio) of the received signal, by selecting the S-N ratio as the estimation standard.

According to the second aspect of the present invention, the transmitting antenna of the first radio station is capable of transmitting high-gain radio waves in different directions by forming a plurality of beams of different maximum radiated directions. In this case, beam identification information being capable of discriminating that a signal is transmitted by a beam of number i among the plurality of beams, is added to the signal transmitted by the beam of number i so that the transmitted respective beams can be discriminated (by the receivers).

In addition, the receiving antenna of the first radio station is capable of receiving signal from a plurality of other radio signals by forming a wide-angle or omni-directional beam. The receiving antenna of the second radio station is capable of receiving the signals transmitted by the beams from the transmitting antenna of the first radio station, and the receiver thereof is capable of selectively receiving a beam of number i among signals of the transmitting antenna of the first radio station on the basis of the estimation standard.

The transmitting antenna of the second radio station forms a wide-angle or omni-directional beam, and transmits a signal, to which information on the number j of the beam selectively received from the beam of the transmitting antenna of the first radio station is added.

In addition, the first radio station is capable of receiving and discriminating a signal, to which the information on the number j of the beam selectively received by the second radio station is added, and of transmitting the signal to the second radio station using the most preferred beam of number j among the plurality of beams of different maximum radiated directions on the basis of the estimation standard.

Moreover, a higher frequency band is used as the frequency band of the radio waves transmitted by the first radio station, and a lower frequency band is used as the frequency band of the received radio waves.

According to the second preferred embodiment of the present invention, it is possible to select a beam of the best communication condition from a plurality of beams for communication. For example, in a case where a shielding lies on the way of transmitted radio wave, it is possible to hold a communication link by different beams arriving by reflection and diffraction.

In addition, in a case where the communication link is deteriorated due to multipass and fading, it is also possible to hold a good communication link by changing the beam. The present invention has great advantageous effects particularly in a mobile communication in which the communication environment varies from hour to hour.

Moreover, according to the second aspect of the present invention, it is possible to arrange for transmitting a great capacity of information from a base station to a terminal, using a simple system by operating a short period of time. Thereafter, since the information is transmitted all at once, It is possible to effectively use-communication capacity, link, frequency band and transmitting-receiving power.

DESCRIPTION OF THE PREFERRED EMBODIMENTS

Referring now to the accompanying drawings, the preferred embodiments of a radio communication system, according to the present invention, will be described in detail.

First of all, the first preferred embodiment of a radio communication system, according to the present invention, which is equipped with a transmitting antenna, a receiving antenna, a receiver, and transmitter will be described.

Figure 4:
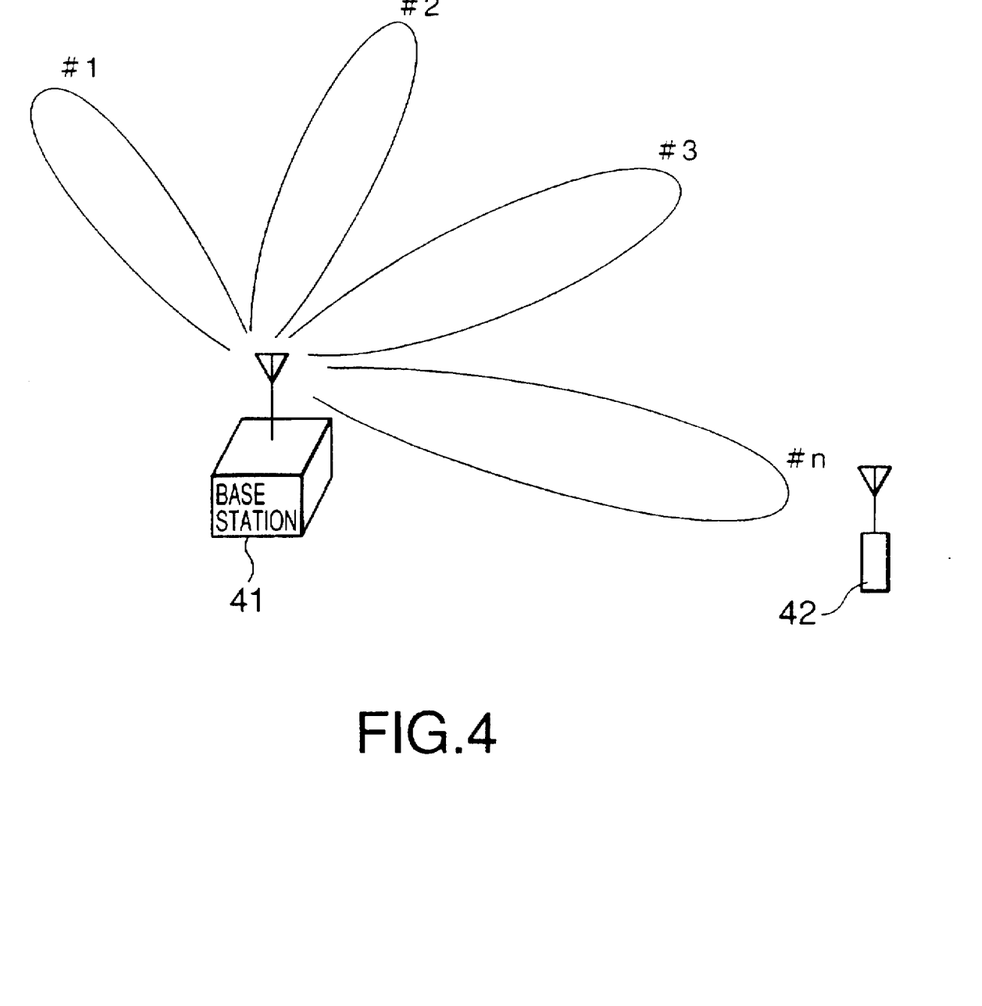
FIG. 4 is a system conceptual view of a radio communication system according to the first embodiment of the present invention.

FIG. 4 illustrates a system image of the first preferred embodiment of a radio communication system according to the present invention. In this figure, a base station 41 forms a plurality of beams (n beams) of different maximum radiated directions for establishing communication, and some of the beams reach a terminal 42. The beams radiated by the base station 41 have a narrow beam-width and a high gain.

In addition, the respective beams may be formed at the same time or sequentially by the time-division system. The detailed structures of antennas will be described later.

Figure 5:
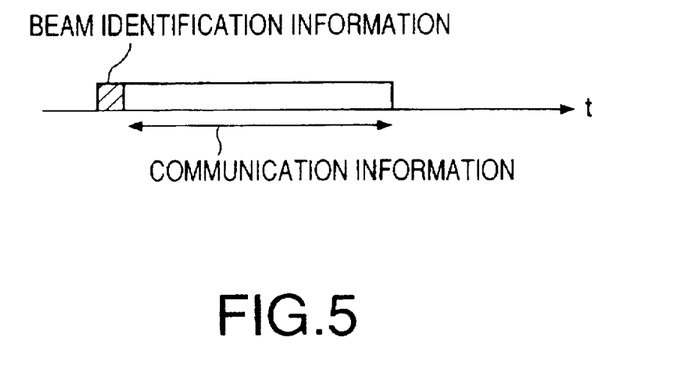
FIG. 5 is a view illustrating the construction of a time slot in a radio communication system according to the first embodiment of present invention.

FIG. 5 illustrates a signal transmitted from each of the beams. This figure illustrates a time slot which is used for a time division multiple access (TDMA) communication system using a digital modulation. This is characterized in that a beam identification information being a beam number information is contained in a time slot.

The point of the present invention is that signals transmitted by a plurality of beams transmitted by a base station contain information for identifying a beam, by which the signal is transmitted. The method for causing the beam identification information to be contained in a S signal should not be limited to the method by the beam number as shown in FIG. 5.

For example, the respective beam number may be discriminated by changing the frequency band for each beam, or the relationship between carrier frequency and beam number information may be established.

The terminal is designed to receive a signal transmitted from the base station and to identify a beam by which the signal is transmitted. For example, in a case where beam number information is contained in a time slot, is the terminal is designed to be capable of discriminating the beam number information, and in a case where the relationship between the beam number and the frequency is established, the terminal is designed to be capable of discriminating the beam number on the basis of the frequency of the received signal.

Although the type of these designs depend upon how to cause beam number information to be contained in a signal, it is possible to identify the beam number using a conventional typical receiver regardless of the type of design. The receiver is designed to be capable of receiving signals from a plurality of beams among transmitted signals, and to select the most preferred signal from these signals on the basis of a predetermined estimation standard.

The first preferred embodiment of a radio communication system according to the present invention, as described above, has the following advantageous effects.

The base station is capable of forming a plurality of beams of different radiated directions, and the terminal (receiver) is capable of selecting the best conditioned beam among the plurality of beams to receive it. Therefore, it is possible to realize the optimum receiving environment (link).

In the environment for mobile communication, in addition to the beam directly turned toward a terminal from a base station, the beams turned to the other directions also tend to reach the terminal due to reflection and diffraction of the beams and so forth. Therefore, even if waves do not directly reach the terminal due to a shielding such as a building, it is possible to prevent the communication link from being interrupted by receiving radio waves of the beams turned to the other directions, so as to be effectively used for mobile communication.

This system is effectively used for anti-multipass and anti-fading in mobile communication. In the case of a conventional system wherein the link between a base station and a terminal is limited to a particular single beam from the base station, if the states of signal (intensity, sensitivity and signal-to-noise ratio (S-N ratio)) are deteriorated under the influence of multipass and fading, it is difficult to maintain a good communication link.

However, according to the present invention, since different link states are realized by a plurality of beams of the base station, it is possible to select the optimum beam among the plurality of beams so as to always make the communication link good.

As the estimation standard as set forth above, the following standards may be established:

(1) a received signal of the maximum intensity (or power) is selected from the signals of the arrived beams, and is received; and (2) a received signal of the maximum signal-to-noise ratio (S-N ratio) is selected from the signals of the arrived beams, and is received.

In a case where the aforementioned estimation standard (1) is used, a beam for transmitting radio waves serving as direct waves which directly reach the terminal from the base station tends to be selected, so that the direction of the selected beam tends to be coincident with the direction of the terminal, whereby the gain tends to be in a high state.

Therefore, it is possible to select the most preferred link on the basis of this estimation standard.

Figure 6:
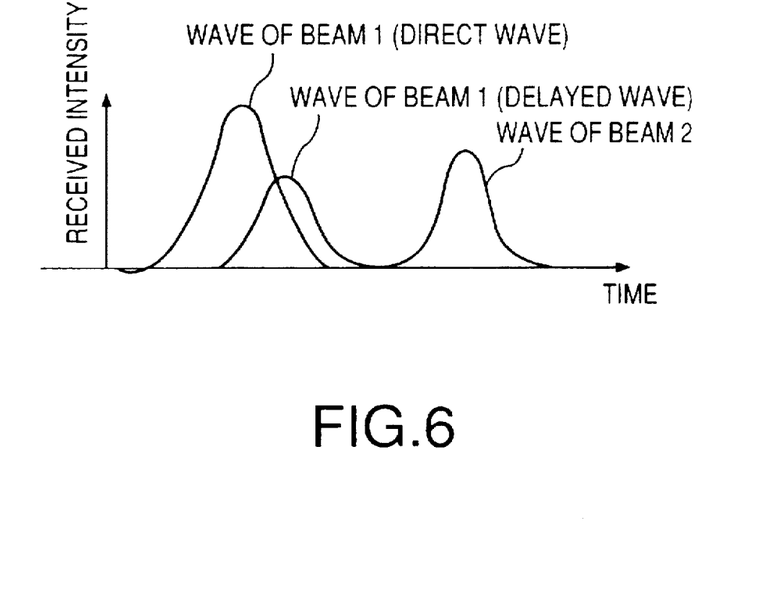
FIG. 6 is a graph showing a received intensity with respect to time of respective beams in a radio communication system according to the first embodiment of the present invention.

In a case where the aforementioned estimation standard (2) is used, it is effective when signals are turbulent under the influence of multipass and/or fading. For example, as the example shown in FIG. 6, in a case where the radio waves transmitted by beams 1 and 2 is able to be received and a direct wave and a delayed wave of beam 1 are simultaneously received to interfere with each other although the intensity of the received radio waves of the beam 1 is higher than that of the beam 2, it is effective to select and receive the radio waves from the beam 2 which has no interference although the received intensity is low.

Thus, it is possible to select the optimum signal in view of environment special to mobile communication by using a signal-to-noise ratio (S-N ratio which may be referred to as SIN ratio since interference is contained in noises in this case) as the estimation standard.

In the case of the aforementioned estimation standard (2), a carrier-to-noise ratio (C-N ratio) may be substituted for the signal-to-noise ratio. There is an advantage in that the C-N ratio is easily measured. If other ratios are used as the estimation standard, the advantageous effects of the present invention are the same. For example, a new estimation standard may be established by combining the aforementioned two standards.

Alternatively, error correction function for use in communication by digital modulation may be utilized to judge the quality of signals of each beams on the basis of the quantity of error correction performed for the signals, so as to select the best conditioned signal.

Then, an antenna which is one element of the radio system will be described. The function of an antenna of the base station in the radio system of the present invention is that a plurality of narrow beams of a high gain and different maximum radiated directions are formed at the same time or by the time-division system. The structure of the antenna having such a function will be described below.

Figure 7:
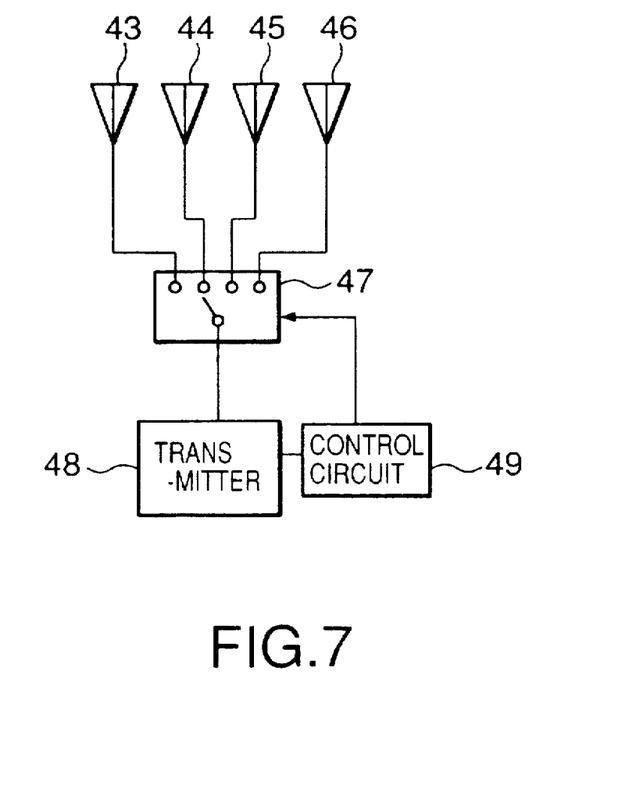
FIG. 7 is a diagram illustrating an example of a transmitting antenna of a base station in a radio communication system according to the first embodiment of the present invention.

FIG. 7 illustrates an example of a transmitting antenna which forms a plurality of beams by changing-over of a switch. Antennas 43, 44, 45 and 46 have beams in which the maximum radiated directions are different from each other. The signals transmitted from a transmitter 48 are changed over by means of a switch 47. The changing-over of the switch is performed by means of a control unit 49, and the beam to be transmitted in synchronism with a transmitted signal is able to be switched in a time domain.

Figure 8:
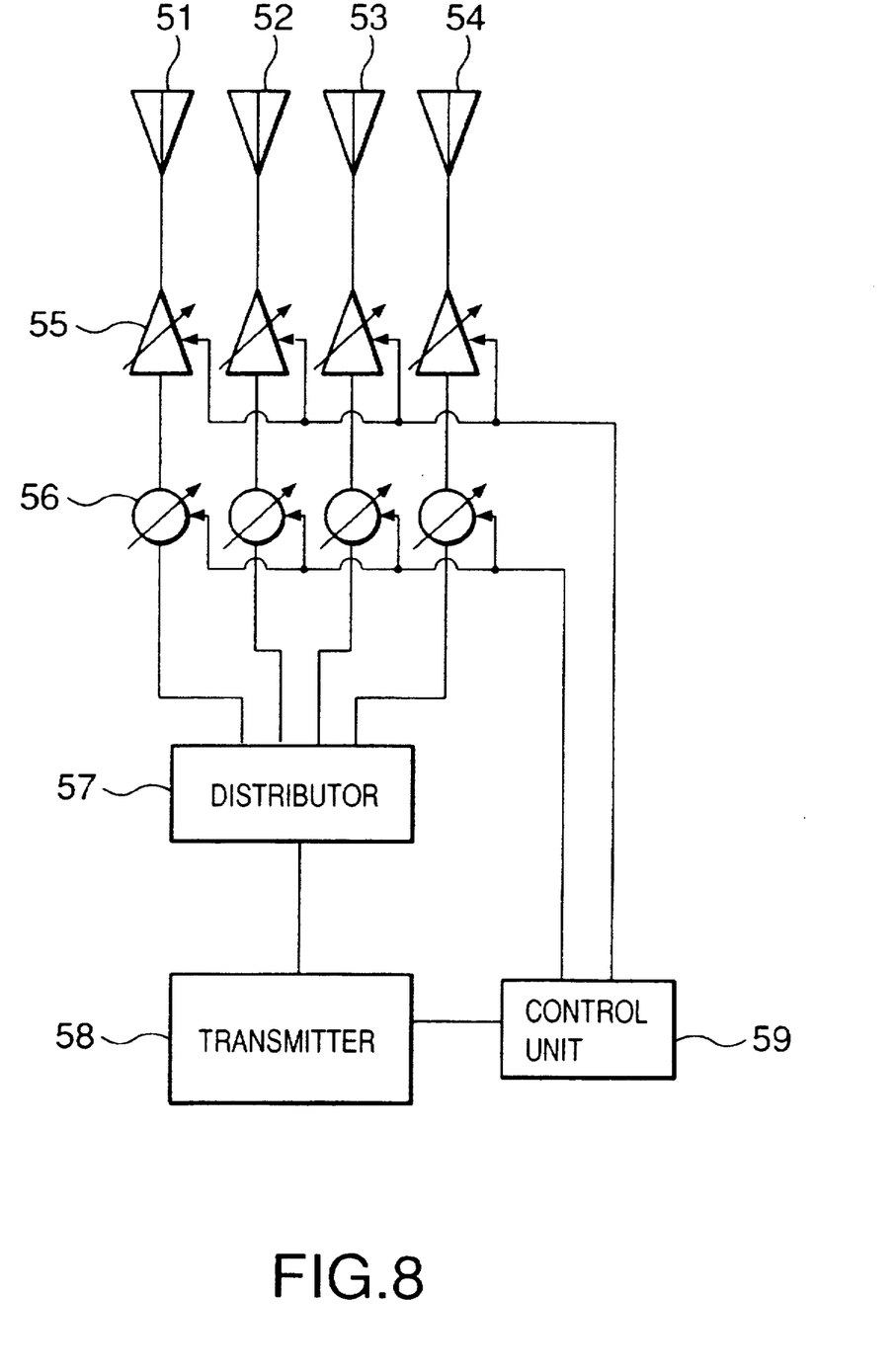
FIG. 8 is a diagram illustrating an example of a transmitting antenna of a base station in a radio communication system according to the first embodiment of the present invention.

FIG. 8 illustrates an example of a transmitting antenna which forms a plurality of beams by means of a phased array antenna. In this case, it is possible to turn the beams to desired directions by applying a given excited weight (amplitude and phase) to a plurality of antenna elements 51, 52, 53 and 54. Since the beam pattern is synthesized by the plurality of antenna elements, it is possible to realize a radiation directivity having a sharp beam and a high gain.

The excited weight is set by amplitude-variable amplifiers 55 and phase shifters 56 which are connected to the respective antenna elements. The amplifiers 55 are provided for setting the excited weight, and may be gain-variable amplifiers. Alternatively, the amplifiers 55 may be the combination of an amplifier and a variable attenuator.

The phase shifters 56 are provided for setting the excited phase, and may use systems of a line switching type, a loaded line type and so forth regardless of the type of system. The output transmitted from a transmitter 58 is distributed toward the respective antenna elements by means of a distributor 57, and the excited weight is set by the amplifiers 55 and the phase shifters 56 as set forth above.

The direction of beam is switched by the time-division system, and is controlled by means of a control unit 59. The control unit 59 identities the beam to which the signal outputted from the transmitter belongs, and sets the gains (amplitudes) of the respective amplifiers and phase shifters and the quantities of phases so as to form the beam.

Figure 9:
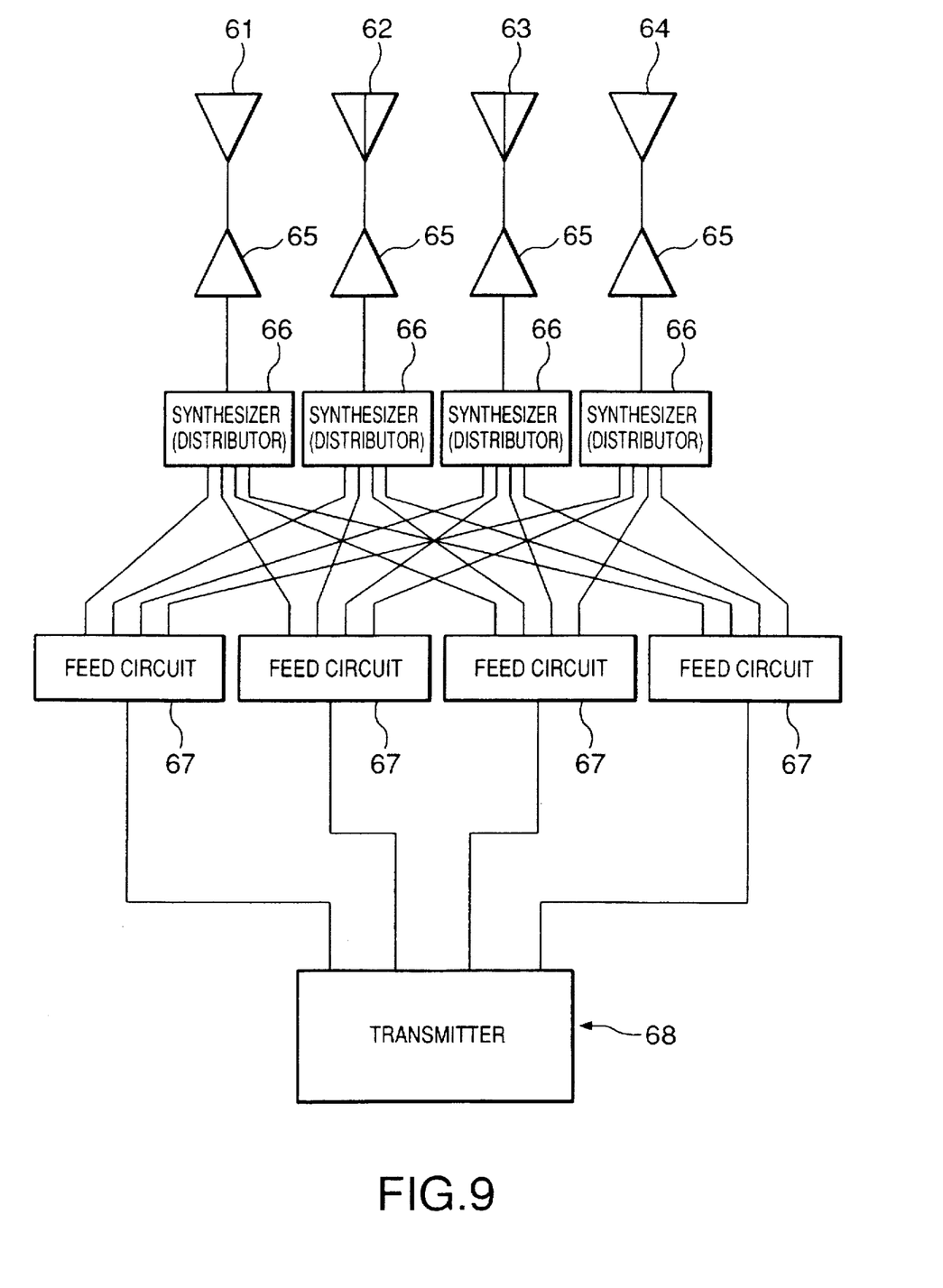
FIG. 9 is a diagram illustrating an example of a transmitting antenna of a base station in a radio communication system according to the first embodiment of the present invention.

FIG. 9 illustrates an example of an antenna which is capable of forming a plurality of beams at the same time. In this figure, the antenna comprises a plurality of antenna elements 61, 62, 63 and 64, to which amplifiers 65 are connected, respectively, for amplifying and transmitting the signals transmitted to the respective antenna elements. In this example, a signal from a transmitter 68 is first divided into signals for each beams, to be transmitted to feed circuits 67 corresponding to the respective beams. The signals transmitted from the transmitter are able to be discriminated for each beam in the frequency domain, the time domain or the other means, and the respective signals discriminated for each beams contain information which is capable of identifying beam numbers to be used. The feed circuits 67 set excited weights for the antenna elements 61, 62, 63 and 64 so as to realize radiation directivities corresponding to the respective beams. In order to set the excited weights, with respect to amplitude, a distributor is provided in each of the feed circuits and its distributed ratio is set at a give value, and with respect to phase, a phase shifter is provided in each of the feed circuits and its passing phase quantity is set at a given value.

Since the distributed ratio and the phase quantity are constant for each beam, the distributor and the phase shifter in the feed circuit may have a simple construction in which the distributed ratio and the phase quantity are constant, not variable. The signals, whose excited weights are set, are collected for each antenna element by means of synthesizers (or distributors) 66 to be transmitted from the respective antenna elements. In this example of an antenna, there is an advantage in that a plurality of beams are commonly used at the same time. In addition, since it is not required to vary (switch) the excited weight, it is possible to simplify a component forming an antenna at a low cost.

In the examples of FIGS. 8 and 9, both of the amplitude and phase have been set for setting the excited weight. However, in order to form beams of different radiated directions, the weight of only amplitude (when the radiation directivities of the antenna elements are different and so forth) or only phase may be varied.

Figure 10:
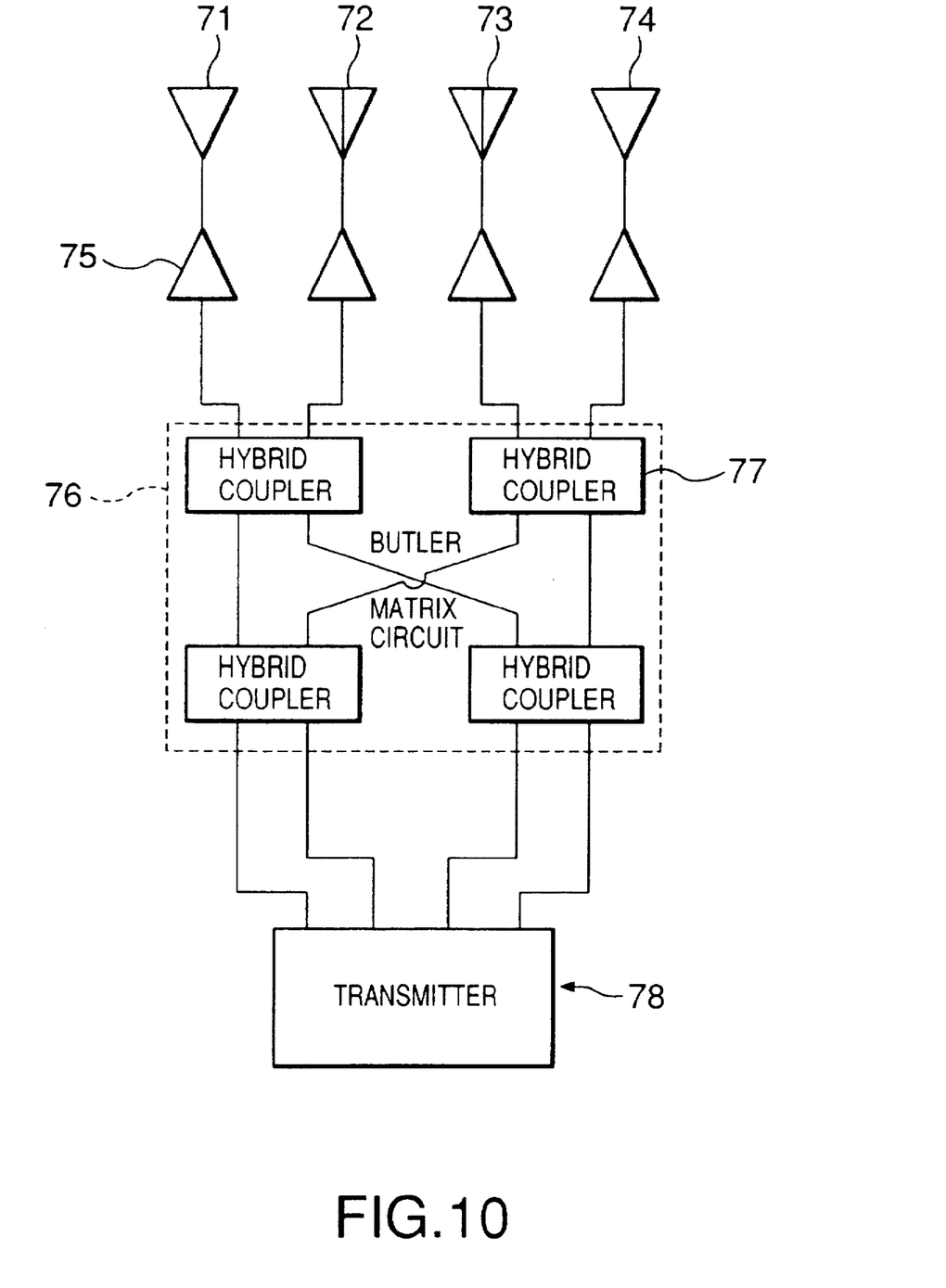
FIG. 10 is a diagram illustrating an example of a transmitting antenna of a base station in a radio communication system according to the first embodiment of the present invention.

FIG. 10 illustrates an example of an antenna which is capable of forming a plurality of beams at the same time, similar to FIG. 9. In this figure, the antenna comprises a plurality of antenna elements 71, 72, 73 and 74, to which amplifiers 75 are connected, respectively, for amplifying and transmitting the signals supplied to the respective antennas. In this example, a signal transmitted from a transmitter 78 is first divided into signals of the respective beams, which are inputted to a Butler matrix circuit 76, respectively.

In the Butler matrix circuit 76, an input signal is distributed by a hybrid coupler 77 so as to appear at output ports thereof at given phase differences, and the output port is connected to the antenna elements to form beams having a synthesized-directivity different from radiated directions. In this example of an antenna, there is an advantage in that a plurality of beams are able to be commonly used at the same time, similar to the example of FIG. 9, and it is possible to simply a component forming an antenna at a low cost. The same operation can be realized by a directional coupler in place of the Butler matrix system.

Furthermore, the antenna of the terminal (receiver) in the first preferred embodiment may use any systems. With respect to the directivity thereof, if it is capable of receiving radio waves from a base station (the directivity gain toward the base station is greater than a certain value, for example, a wide-angle directivity), it is possible to obtain the advantageous effects of the present invention. Naturally, it is possible to realize a better communication state by enhancing the gain of the receiving antenna.

As a method for enhancing the gain of the receiving antenna, for example, it is possible to use a beam scanning antenna which turns a beam toward a base station or a radio-waves arrival direction (for example, a phased array antenna), and an adaptive antenna which suppresses jamming waves by forming the directivity.

Referring to the figures, the second preferred embodiment of a radio system according to the present invention will be described below.

Figure 11:
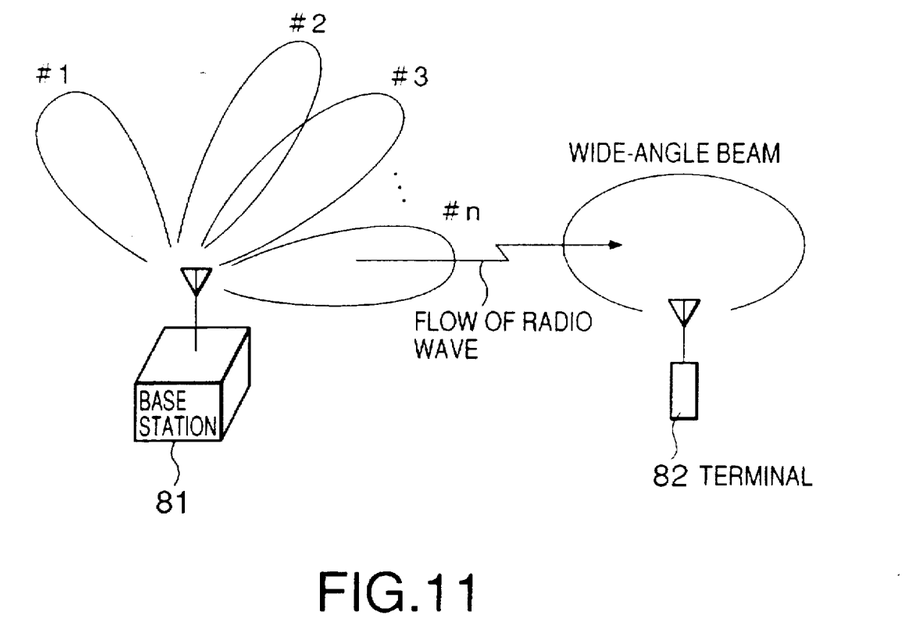
FIG. 11 is a system conceptual view of a radio communication system according to the second embodiment of the present invention.
Figure 12:
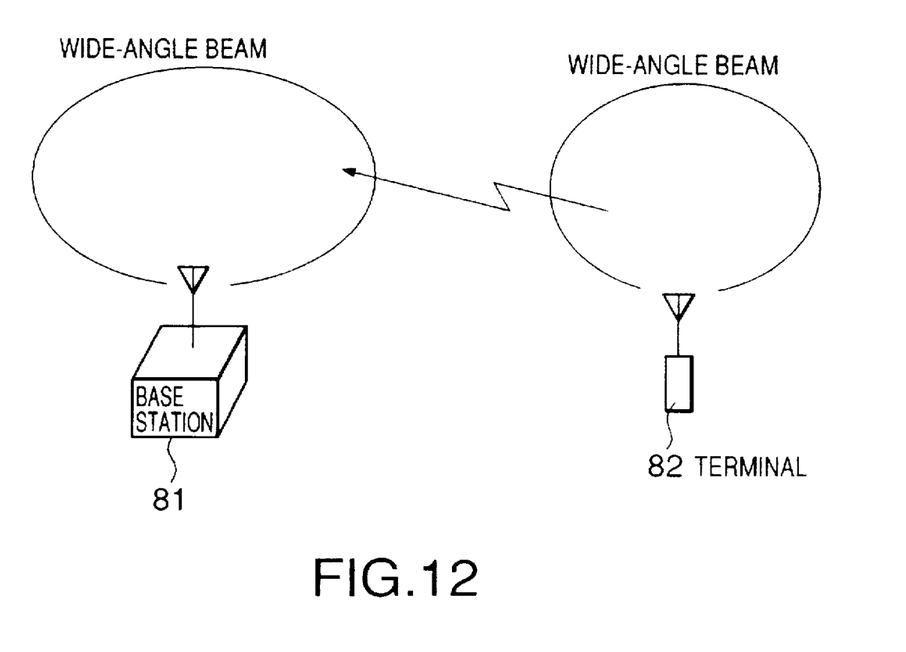
FIG. 12 is a system conceptual view of a radio communication system according to the second embodiment of the present invention.

FIGS. 11 and 12 illustrate the second preferred embodiment of a radio system according to the present invention. FIG. 11 illustrates the propagation of radio waves transmitted from a base station 81 (first radio station) and received by a terminal 82 (second radio station), and FIG. 12 illustrates the propagation of radio waves transmitted from the terminal 82 and received by the base station 81.

The base station 81 forms a plurality of beams (n beams) of different maximum radiated directions to transmit the beams. Among these beams, a number of beams reach the terminal 82. The beams radiated from the base station 81 have a narrow beam and a high gain. The respective beams may be formed at the same time or by the time-division system. The constructions of the antennas thereof are the same as those of FIGS. 7 through 10 in the first preferred embodiment. The signals transmitted from the respective beams of the base station 81 is also the same as that of FIG. 5.

The feature of this preferred embodiment is that the signals transmitted by the plurality of beams transmitted by the base station contain information being capable of identifying a beam by which the signal is transmitted. In addition to the case of FIG. 5, the respective beam numbers may be identified by changing the frequency band for each beam, or the relationship between the carrier frequency and the beam number information may be established. In the terminal 82, the signals transmitted from the base station are received by an antenna of a wide-angle directivity, and it is designed to identify a beam by which the signal is transmitted.

Although this design depends upon how to cause information on beam number to be contained in the signal, it is possible to identify the beam number using a conventional typical receiver regardless of the design. The receiver is designed to be capable of receiving signals from a plurality of beams among the transmitted signals, and of selecting the optimum signal from these signals on the basis of a predetermined estimation standard.

The predetermined estimation standard may be the same as that in the first preferred embodiment of a radio communication system according to the present invention.

FIG. 12 illustrates the state in which the radio-wave signal transmitted from the terminal 82 is received by the base station 81. In this case, both of the transmitting antenna of the terminal and the receiving antenna of the base station have a wide-angle directivity.

Figure 13:
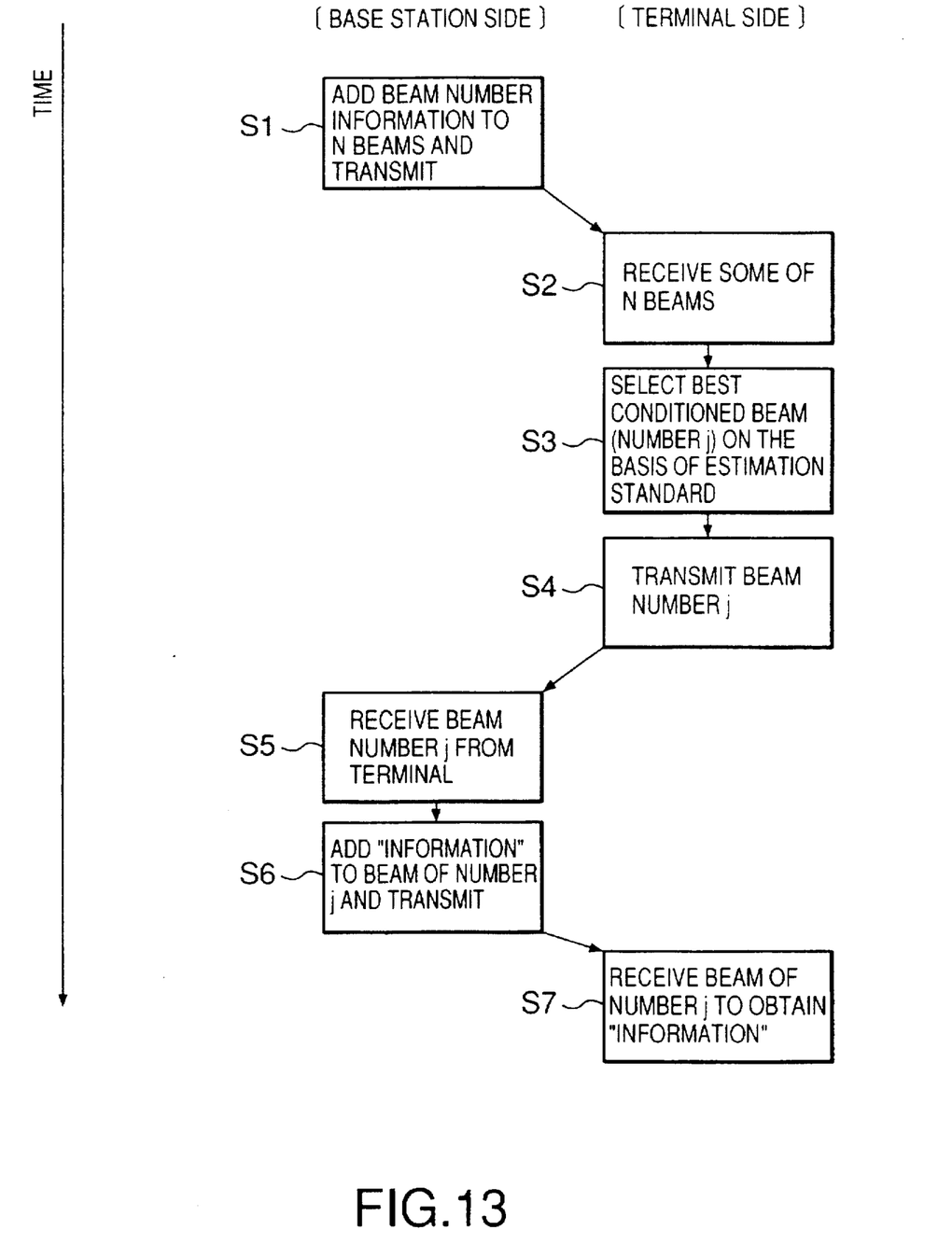
FIG. 13 is a flowchart illustrating a communication control method in a radio communication system according to the second embodiment of the present invention.

FIG. 13 is a flowchart illustrating a communication method in the second preferred embodiment of a radio communication system, according to the present invention, which is shown in FIGS. 11 and 12. The operations in the respective steps will be described below.

At step S1, in the base station, signals containing beam number information on all of n beams are carried on signals to be transmitted, and the signals are transmitted from the base station.

Then, the operations at steps S2 through S4 are performed on the terminal side. First, at step S2, one beam or more among n beams are received. This receiving is performed by a receiving antenna of a wide-angle beam. Then, at step S3 the best beam number is selected from the beam (beam number) received by the terminal in a predetermined estimation standard, and the selected beam number is assumed to be j. This selection may be performed by a processor, such as a CPU, or a comparator for merely comparing gains and so forth. Thereafter, at step S4, the selected beam number j is transmitted from the terminal toward the base station. This transmission is performed by a transmitting antenna of a wide-angle beam.

Then, at step S5, the base station receives the beam number j transmitted from the terminal. This receiving is performed by a receiving antenna of a wide-angle beam.

Then, at step S6, the base station transmits "information", which the terminal desires to be transmitted, using a beam of number j among a plurality of beams formed by the transmitting antenna. The term "information" herein is information, such as image, picture, voice and other data, which is requested by the terminal.

Then, the operation returns the terminal side again, and at step S7, the terminal receives the signal transmitted from the beam of number j the base station, and obtains the required information.

According to the system construction and control method as mentioned above, in addition to the advantageous effects of the first preferred embodiment, it is expected that the second preferred embodiment has the following advantageous effects.

First of all, the "information" finally requested by the terminal has a large volume of information such as picture, image and data. According to the conventional method, in order to this information without any errors, it is required to accurately enhance the gain of an antenna and control the direction of a beam so as to form a good communication link, so that the processing therefor and the construction of a radio transmitter-receiver are complicated.

However, according to the present invention, there is an advantage in that it is possible to form a communication link by a short period of time using a simple radio system, since only beam information is exchanged at the stage prior to the formation of a good communication link and since the antenna to be used has a wide-angle, simple structure.

There is also an advantage in that it is possible to effectively use communication links, frequency bands and output power on the transmitting side, by quickly transmitting and receiving information to be requested by the terminal after realizing the good communication link.

To put the aforementioned advantageous effects in other words, there is a great advantageous effect in order to increase the number of terminals (the number of users) joined in this communication system.

Moreover, it is convenient to perform the exchange of information at a large capacity and at a high speed.

In a communication service for offering various information on demand from a terminal, although the information capacity from the terminal to a base station is small, the information capacity from the base station to the terminal is great. If the present invention is applied to such a radio communication system, there is an extremely great advantageous effect.

According to the present invention, the same effect can be obtained if the following changes are done.

First of all, dB the receiving antennas of FIGS. 11 and 12 (the receiving antenna of the terminal 82 in FIG. 11, and the receiving antenna of the base station 81 in FIG. 12), a high-gain antenna, such as a phased array antenna and an adaptive antenna, which is capable of accurately forming beams In the arrival direction of radio waves, may be used. In particular, it is possible to transmit information at a larger capacity and at a higher speed by enhancing the gain of the receiving antenna of the terminal at the stage (step 57) at which the information is finally received from the base station.

While the plurality of beams transmitted from the base station have had different maximum radiated directions in the aforementioned preferred embodiments, some of the plurality of beams may have the same maximum radiated direction. In this case, since the condition for causing interference such as multipass and fading is varied by changing the transmitting frequency of the beam radiated in the same direction, the probability that the communication link can be maintained by any one of the frequencies.

While the information on the beam number has been arranged at the head (or a part) of a time slot in FIG. 5, it may be arranged at any places in the frame. In particular, it is possible to effectively use the frame by independently providing a slot (in which the respective beam numbers are transmitted by the respective beams) for transmitting only the beam number.

What is claimed is:

1. A radio communication system comprising:
   a first radio station including
      a single transmitting antenna for forming a plurality of beams of different maximum radiated directions, said first radio station adding to a signal, transmitted by a beam of number i among the plurality of beams, beam identification information that is capable of discriminating that said signal is transmitted by said beam of number i, and
      a receiving antenna for receiving radio signals, which are transmitted from other radio stations by a wide-angle or omni-directional beam; and
   a second radio station including
      a receiving antenna which is capable of receiving said signals transmitted by said beams from said receiving antenna of said first radio station,
      a receiver for selectively receiving, on the basis of an estimation standard, a signal of a beam of number j among specific beams formed by said transmitting antenna of said first radio station, and
      a transmitting antenna for forming a wide-angle or omni-directional beam to transmit said beam of number j selectively received among the beams transmitted from said transmitting antenna of said first radio station.

2. A radio communication system according to claim 1, wherein
   said first radio station receives a signal, to which information on said number j of said beam selectively received by said second radio station is added, and wherein said signal to be transmitted to said second radio station is transmitted by using said beam of number j among said plurality of beams of different maximum radiated directions.

3. The radio communication system according to claim 1: wherein
   a frequency band of radio waves transmitted by said first radio station is higher than a frequency band of received radio waves.

4. A radio communication method comprising:
   receiving a radio signal from among a plurality of radio signals, the radio signal being transmitted by one or more beams to which beam identification information is added;
   selecting optimum beam identification information which corresponds to the best beam from transmitting the radio signal, according to a predetermined estimation standard;
   requiring a transmission of communication information included in the radio signal transmitted on the beam having the selected beam identification information; and
   receiving the communication information included in the radio signal, wherein the method includes
      forming a plurality of beams each having different maximum radiated directions by means of a transmitting antenna of a first radio station, and adding, to a radio signal transmitted by a beam of number i among the plurality of beams, beam identification information that is capable of discriminating that said radio signal is transmitted by said beam of number i,
      receiving said radio signal transmitted by said beam from the transmitting antenna from said first radio station, by means of a receiving antenna of a second radio station,
      selecting a signal of a beam of number j from specified beams of the transmitting antenna of said first radio station according to said predetermined estimation standard, by means of a receiver of said second radio station,
      transmitting said beam of number j which is selectively received from the plurality of beams transmitted from said transmitting antenna of said first radio station, by a formed wide-angle or omni-directional beam, by means of a transmitting antenna of said second radio station,
      receiving radio signals transmitted from other radio stations by a wide-angle or omni-directional beam, by means of a receiving antenna of said first radio station, and
      acquiring communication information by receiving the communication information with the beam identification information which is transmitted through the transmitting antenna of said first radio station, by means of the receiving antenna of said second radio station.

5. The radio communication system according to claim 4, wherein
   said predetermined estimation standard is intensity of a radio signal, and wherein a signal of a beam of the maximum received-signal intensity transmitted from said transmitting antenna is selected.

6. The radio communication system according to claim 4, wherein
   said predetermined estimation standard is a signal-to-noise ratio (S-N ratio) of a received signal, and wherein a signal of a beam of the maximum S-N ratio transmitted from said transmitting antenna is selected.

7. The radio communication system according to claim 4, wherein
   said predetermined estimation standard is said beam identification information, and wherein a signal of a beam specified by said beam identification information is selected.

8. A radio communication system comprising:
   a first radio station including
      a transmitting antenna for forming a plurality of beams of different maximum radiated directions, said first radio station adding to a signal transmitted by a beam of number i among the plurality of beams, beam identification information that is capable of discriminating that said signal is transmitted by said beam of number i, and a receiving antenna for receiving radio signals, which are transmitted from other radio stations by a wide-angle or omni-directional beam; and a second radio station including a receiving antenna which is capable of receiving said signals transmitted by said beams from said transmitting antenna of said first radio station, a receiver for selectively receiving, on the basis of an estimation standard, a signal of a beam of number j among specific beams formed by said transmitting antenna of said first radio station, and a transmitting antenna for forming a wide-angle omni-directional beam to transmit said beam of number j selectively received among said beams transmitted from said transmitting antenna of said first radio station;

wherein said second radio station uses at least one of a narrow-angle or unidirectional beam in transmitting and receiving communication information, together with said wide-angle or omni-directional beam.

* * * * *